US008689948B2

(12) United States Patent
Winkler (10) Patent No.: US 8,689,948 B2
(45) Date of Patent: Apr. 8, 2014

(54) MACHINE TOOL HAVING A BRAKE SYSTEM (75) Inventor: Thomas Winkler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 12/736,315

(22) PCT Filed: Mar. 31, 2009

(86) PCT No.: PCT/EP2009/053787
§ 371 (c)(1),
(2), (4) Date: Dec. 6, 2010

(87) PCT Pub. No.: WO2009/121866
PCT Pub. Date: Oct. 8, 2009

(65) Prior Publication Data
US 2011/0094835 A1 Apr. 28, 2011

(30) Foreign Application Priority Data
Mar. 31, 2008 (DE) .......................... 10 2008 000 891

(51) Int. Cl.
*F16D 51/16* (2006.01)
(52) U.S. Cl.
USPC ....... 188/78; 83/58; 192/105 CD; 192/129 R; 188/185
(58) Field of Classification Search
USPC ........... 83/58, 62; 188/78, 180, 181 A, 181 T, 188/184–186; 192/105 BA, 105 CD, 105 CE, 192/105 CF, 105 R
See application file for complete search history.

(56) References Cited

U.S. PATENT DOCUMENTS

| 2,471,747 | A | * | 5/1949 | Hinden et al. | ......... 192/105 CD |
| 2,808,905 | A | | 10/1957 | Bohl | |
| 2,818,147 | A | * | 12/1957 | Mall et al. | ..................... 477/175 |
| 3,026,980 | A | * | 3/1962 | Hoff | ...................... 192/105 BA |
| 3,032,146 | A | | 5/1962 | Szabo et al. | |
| 3,329,245 | A | * | 7/1967 | Freber | ......................... 192/55.61 |
| 3,576,242 | A | * | 4/1971 | Mumma | ..................... 193/35 A |
| 3,737,018 | A | * | 6/1973 | Helmers | .................... 400/338.1 |
| 3,785,465 | A | * | 1/1974 | Johansson | .................... 192/48.5 |
| 3,857,180 | A | * | 12/1974 | Dooley | ........................... 30/383 |
| 3,858,095 | A | * | 12/1974 | Friemann et al. | ......... 192/129 A |

(Continued)

FOREIGN PATENT DOCUMENTS

| DE | 21 47 669 | 4/1972 |
| DE | 87 08 955 | 12/1987 |
| DE | 195 36 995 | 4/1997 |
| SU | 474498 | 6/1975 |

OTHER PUBLICATIONS

"Cut Stop" (VDI/VDE/IT) by Institute fuer Wekzeugmaschiner (IFW) {Institute for Machine Tools] of the University of Stuttgart.*

*Primary Examiner* — Christopher Schwartz
(74) *Attorney, Agent, or Firm* — Kenyon & Kenyon LLP (57) ABSTRACT

A machine tool having an emergency braking system for abruptly braking a rotating shaft of the machine tool to protect a user of the machine tool, the emergency braking system having a brake drum that can be forced into engagement with the at least one brake shoe to brake the shaft. The brake drum and the at least one brake shoe are designed and configured in a way that allows the braking engagement therebetween to take place under the influence of a centrifugal force or centrifugal acceleration resulting from the rotation of a shaft.

9 Claims, 9 Drawing Sheets

(56) References Cited

U.S. PATENT DOCUMENTS

| | | | |
|---|---|---|---|
| 3,971,462 A * | 7/1976 | Johansson | 192/105 BA |
| 3,971,463 A * | 7/1976 | Zindler | 192/105 BA |
| 4,282,953 A * | 8/1981 | Lichti et al. | 188/189 |
| 4,531,617 A | 7/1985 | Martin et al. | |
| 5,105,925 A | 4/1992 | Tremaglio et al. | |
| 5,560,465 A * | 10/1996 | Zindler | 192/105 BA |
| 6,247,570 B1 * | 6/2001 | Zindler | 192/105 BA |
| 6,550,597 B2 * | 4/2003 | Taniguchi | 192/215 |
| 8,002,091 B2 * | 8/2011 | Chabrut | 188/181 A |
| 2011/0048197 A1 * | 3/2011 | Winkler | 83/58 |
| 2011/0061504 A1 * | 3/2011 | Winkler | 83/58 |
| 2011/0088525 A1 * | 4/2011 | Winkler | 83/62 |
| 2011/0088985 A1 * | 4/2011 | Winkler | 188/78 |
| 2011/0094359 A1 * | 4/2011 | Winkler | 83/58 |

\* cited by examiner

MACHINE TOOL HAVING A BRAKE SYSTEM

FIELD OF THE INVENTION

The present invention relates to a machine tool, in particular to a saw and especially particularly to a circular saw, having a protection system, the protective action of the protection system being deployed within a very short time interval, for example, within the span of a few milliseconds (typically 1-50 ms), in order to protect a machine tool user from injury in dangerous situations.

BACKGROUND INFORMATION

There are presently essentially three different approaches for implementing a protection system for circular saw benches and panel sizing saws whose purpose is to prevent a user from coming into contact with a circulating saw blade or from suffering a serious cut wound.

The protection system registered and marketed under the company name Sah Stopp Inc., an American manufacturer, is an emergency braking system that allows the machine tool to be braked in response to a direct engagement of a braking actuator on the saw blade, as soon as a dangerous situation is detected by a sensor designed for that purpose. In this connection, a hot-wire trigger is used to push a rotationally mounted aluminum block with the aid of a pretensioned spring into the tooth system of the running saw blade, wedging it therein and thereby absorbing the rotational energy of all of the machine tool geometries that rotate during the sawing process. This one-sided application of force on the cutting edges has the secondary effect of retracting the saw blade into the saw bench via a structurally specially designed suspension configured on the saw bench. With the aid of this assembly, one is able to prevent serious injury to the machine tool operator who triggers the protective mechanism. The inherent disadvantage here is the direct action exerted on the machining tool, thus on the cutting geometry of the saw blade, since further potential danger is posed to the user by the breaking away of tooth system parts. Moreover, to restore the operability of the protection system, the braking unit, including the saw blade, must be replaced with an operable replacement unit. This must be stocked by the user to allow work to continue once a braking action using the protection function has taken place. This entails substantial follow-up costs and associated time expenditure for procurement and installation. It can also be assumed that all of the components affected by the braking action, i.e., all rotating geometries of the machine tool, are subject to high loads during the deceleration phase. Neither the manufacturer of this system nor relevant publications report data regarding the fatigue strength of the system.

Another approach provides for using a protection system exclusively to lower the saw blade into the saw table without initiating a braking action for the saw blade. In this case, a pyrotechnic priming charge is used to remove the saw blade, including the main shaft and its bearing, from the danger zone, so that serious injury to the user can be prevented. The inherent disadvantage of this type of protection system is that relatively large masses, in the form of assemblies to be lowered, must be moved under strict time stipulations in the millisecond region. The thereby necessitated pyrotechnic igniters, which prove to be indispensable for this type of protection actuator, also entail an expensive reversibility of parts. The capability to immediately continue working on the machine tool using an operable protection system, is hereby limited, both temporally as well as organizationally. Moreover, a limited space and a very specific procedural method make this protection system only suited for relatively large stationary apparatuses, such as circular saw benches, for example, which are able to accommodate such an assembly in the interior thereof. However, this system is eliminated from consideration for a use on smaller manual apparatuses, such as cross-cut and miter saws or panel saws, for example.

A publication from a publicly funded project called "Cut-Stop" (VDI/VDE/IT) for a protection system for panel sizing saws from the Institut für Werkzeugmaschinen (Institute for Machine Tools) (IFW) of the University of Stuttgart describes an approach which employs a special form of a disk brake system, namely a self-energizing wedge brake, to bring the main shaft of the machine tool and thus the saw blade to a standstill. A pyrotechnic igniter is used to accelerate and subsequently push a wedge between a fixed wedge guide in the form of a modified brake caliper and the rotating brake disk. For the selection and combination of specific wedge angles $\alpha$ and brake lining values $\mu$, the assembly has a self-locking effect, so that, depending on the inertia of the mass to be decelerated, the particular time requirements of the braking action can be met by this design. However, even in this case, as described in the mentioned publication, this protection system has the disadvantage that, following triggering of the protection actuator, it is necessary to replace the complete brake unit due to the wedge that is jammed into the friction pairing. The time required to completely restore system readiness is approximately 10-12 minutes for the scope of work to be performed. Thus, it holds in this case as well that the immediate reversibility of the system is somewhat limited.

German Patent Application DE 195 36 995 A1 discusses a safety brake for elevators that has a device which, in response to exceedance of a defined maximum velocity of the conveyance arrangement, brakes the drive at a velocity-dependent deceleration and, if indicated, also stops the same. The safety brake of the German Patent Application DE 195 36 995 A1 acts as a function of the speed directly on the driving disk of the cable-actuated conveyance system and is able to limit the rotational speed thereof. In addition, the safety brake designed as a centrifugal brake has a device for boosting the braking power as a function of the conveying velocity.

Against this background, it is an object of the exemplary embodiments and/or exemplary methods of the present invention to devise a machine tool having an alternative design, a protection system of the machine deploying its protective action very rapidly, in particular within a few milliseconds (typically 1-50 ms), and at least partially resolving the problems described at the outset.

SUMMARY OF THE INVENTION

To achieve this objective, the exemplary embodiments and/or exemplary methods of the present invention provides a machine tool, in particular a saw, having an emergency braking system for abruptly braking a rotating shaft of the machine tool, the emergency braking system having a brake drum and at least one brake shoe which are forced into mutual engagement to brake the shaft of the machine tool. The brake drum and the at least one brake shoe are designed and configured in a way that allows the braking engagement therebetween to take place under the influence of the centrifugal force or centrifugal acceleration resulting from the rotation of the shaft.

Accordingly, the exemplary embodiments and/or exemplary methods of the present invention is directed to realizing the deceleration of the rotating shaft of the machine tool by utilizing the existing rotational energy of the rotating shaft with the aid of the design of a self-energizing or self-locking friction pairing. It is possible in this manner to ensure the specified braking time frame, which is within a span of a few milliseconds. The embodiment of the brake in accordance with the present invention makes it possible for a tool, which is directly or indirectly driven by a shaft, to be braked within very rapid time periods of, typically, within the range of from 1 to 50 ms, advantageously within the range of from 1 to 20 ms and, in particular, within the range of 10 ms and less.

When braking the machine tool, there is advantageously no direct engagement with the tool. Such an engagement would inevitably involve destruction of the tool. The machine tool according to the present invention brakes the shaft that is driving the tool directly or indirectly. In this manner, the tool itself remains undamaged.

In this context, it should be clear that the triggering of the braking process, which, for example, follows in response to an output signal of a sensor, which detects a dangerous situation for the user, mechanically, electromechanically, pyrotechnically, pneumatically or hydraulically and, in principle, is not bound to any specific medium, however, an electromechanical triggering may be due to a simple design and an excellent reversibility.

The machine tool according to the present invention may be a saw, in particular, a circular saw, for example, a circular saw bench or a hand-held saw, but also a cross-cut and miter saw, a panel saw, a band saw, a scroll saw or the like.

Moreover, the machine tool according to the present invention may also be designed as a sander or power drill, for example, in particular, as a benchtop drilling machine.

The machine tool according to the present invention is not limited to the described exemplary embodiments. It should be clear that the brake system according to the present invention is also applicable to other machine tools that, for a specific reason, are dependent on an actively triggerable deceleration within a specified time frame in the millisecond range. In particular, machine tools having a tool that is operated directly or indirectly via a shaft are able to be developed in accordance with the present invention.

In accordance with one embodiment of the present invention, the at least one brake shoe of the emergency braking system of the machine tool in accordance with the present invention is pivotably attached to a brake-shoe holder that is mounted on the rotating shaft and co-rotates therewith.

A locking device may be provided that is adjustable between a locked position, in which the brake shoe is held in position on the brake-shoe holder, and a release position in which the at least one brake shoe is released in a way that allows it to execute a slewing motion in the direction of the brake drum in order to produce the braking engagement. In other words, as soon as the locking device is moved to its release position, the at least one brake shoe that co-rotates with the shaft is abruptly moved by the centrifugal force, within a few milliseconds, toward the fixed brake drum.

The locking device may include at least one locking element that is movable between a locked position, in which it engages with the at least one brake shoe, and a release position, in which it is decoupled from the brake shoe. Such a locking element may be designed as a locking pin or the like, for example.

The locking device advantageously includes an actuator which moves the locking device from the locked position to the release position. This actuator may be a solenoid actuator, for example, which pulls a ring armature, to which a locking element in the form of a locking pin is secured, in order to disengage the locking pin from the brake shoe, thereby releasing the same.

In addition, the emergency braking system may include a coupling device that is devised in such a way that, in its coupled position, it connects the shaft to be braked to a drive train, and that, during an emergency braking, it is automatically moved to its decoupled position in which the drive shaft to be braked is decoupled from the drive train. This type of decoupling of the drive train during an emergency braking action ensures that the drive train, which, for example, may feature a drive shaft and any existing gear stages, is excluded from the actual braking action, whereby the drive train is not subjected to the substantial deceleration torques occurring during the braking action. Here, the advantage is derived, on the one hand, that drive train components cannot be damaged during the braking action. On the other hand, there is no need to structurally adapt the geometries of the drive-side components to the requirements of the braking action, so that they are able to be manufactured in a less rugged and less expensive form. The moment of inertia of the mass to be decelerated is also beneficially reduced since there is no need to brake the drive train components. It is thus possible for the system load to be decisively reduced during the deceleration phase. Accordingly, the period of time required for the braking action for the saw blade may be substantially shortened given the same force application. Alternatively, the force application may, of course, also be reduced given an unchanged deceleration time period.

In accordance with one embodiment, the shaft to be decelerated is designed as a hollow shaft within whose hollow space, a drive shaft of the drive train is positioned. In this context, the coupling device is advantageously formed by a projection that is provided on the at least one brake shoe and which, in the coupled position, extends through a through-hole provided in the shaft to be braked, into a recess of the drive shaft, so that the drive shaft and the shaft to be braked are coupled to one another in a torsionally fixed manner, and which projection, in the decoupled position, is disengaged from the recess of the drive shaft, so that the shaft to be braked is no longer driven by the drive shaft. In this manner, a decoupling of the drive train may be implemented during the braking action. The projection may engage positively with the recess, thereby achieving a reliable engagement of the projection in the recess. To this end, the projection may have an arcuate form and the recess a prism shape, for example.

It is noted at this point that the number of projections need not necessarily correspond to the number of recesses. It is thus possible, for example, for four recesses and merely two projections to be provided. This is advantageous in that, following a triggering of the emergency braking system, the drive shaft only needs to be slightly rotated to position the projections again in a pair of recesses. It is likewise possible for more than two brake shoes to be provided, of which, however, only two must be fixed in position at the drive shaft via corresponding connections formed from a projection and a recess.

In addition, the emergency braking system in accordance with the present invention may have a reset device for moving the at least one brake shoe back to its initial position, in order to ensure a complete reversibility of the system following completion of a braking action. In this context, the reset device is designed in close coordination with the self-energization of the friction pairing and thus with the geometry of the brake system. The reset device may, for example, be implemented both through the use of properly dimensioned tension, as well as compression spring elements.

In the following, exemplary specific embodiments of the present invention are described more precisely with reference to the enclosed drawings. The description, the corresponding figures, as well as the claims include numerous features in various combinations. One skilled in the art will consider these features, in particular, also the features of various exemplary embodiments, individually as well, and conceive of other useful combinations.

DETAILED DESCRIPTION

FIG. 1 through 6 show schematic views of an emergency braking system for machine tools according to the present invention that is generally denoted by reference numeral 10 and is used for bringing a tool of the machine tool, for example a saw blade, to a standstill, in a dangerous situation, in a very short time period that is advantageously within a span of a few milliseconds.

FIG. 7 through 13 then show exemplarily machine tools having such an emergency braking system.

Before discussing the integration of the emergency braking system in various machine tools in greater detail, its design and function will first be described.

Emergency braking system 10 encompasses a stationary brake drum 12, which is affixed to a frame component (not shown in detail) of the circular saw bench. This frame component must be structurally designed to be able to withstand and absorb the braking torques produced during the deceleration phase. In addition, emergency braking system 10 includes a brake-shoe holder 14 that is fixed-mounted to a saw-blade side output shaft 16, so that it rotates with the same in the rotational direction characterized by arrow 17. Two mutually diametrically opposing brake shoes 18, which are each rotationally mounted about a swivel pin 20, are affixed to brake-shoe holder 14. On their surface facing brake drum 12, brake shoes 18 are each provided with a friction lining 22, these friction linings 22 being forced into engagement with fixed brake drum 12 during a braking action of emergency braking system 10, so that friction linings 22 and brake drum 12 form a friction pairing. In the state illustrated in FIG. 1, in which the braking action was not yet triggered, brake shoes 18 are held securely with the aid of locking pins 24 to brake-shoe holder 14, so that they are not able to rotate about swivel pin 20.

Figure 1:
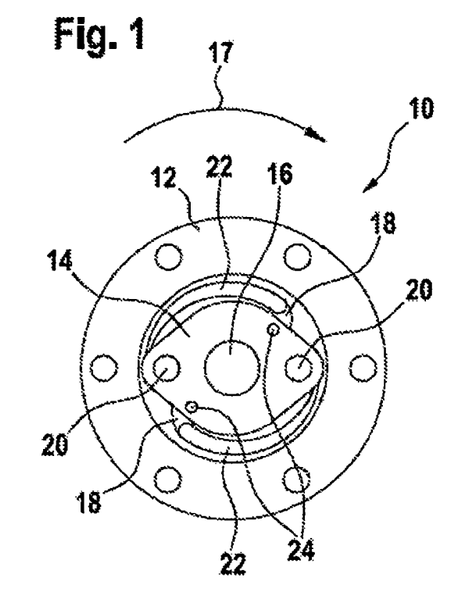
FIG. 1 shows a schematic front view of an emergency braking system of a machine tool according to the present invention in accordance with a specific embodiment of the present invention in a state in which the braking action was not triggered.
Figure 2:
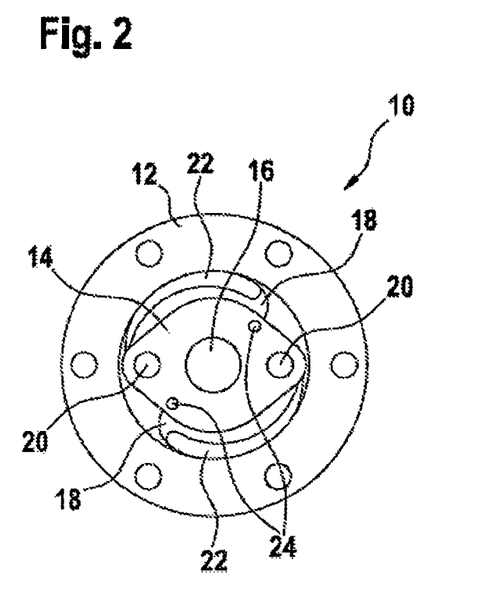
FIG. 2 shows a schematic front view of the emergency braking system illustrated in FIG. 1 in a state in which the braking action was triggered.
Figure 3:
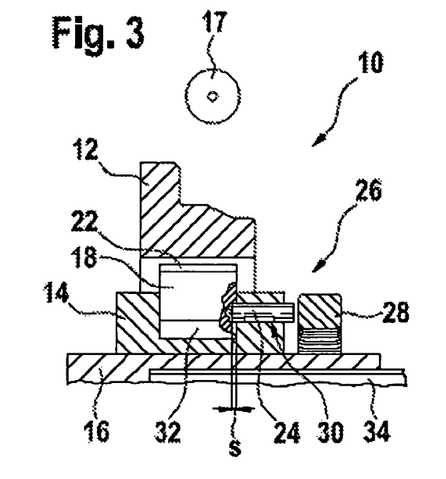
FIG. 3 shows a longitudinal sectional view of the emergency braking system illustrated in FIGS. 1 and 2 in a state in which the braking action was not triggered.

The locking pins 24 are part of a locking device 26 which, in addition, has a solenoid actuator 28, via which locking pins 24 are adjustable between a locked position, in which brake shoes 18 are held in position on brake-shoe holder 14, and a release position in which brake shoes 18 are released in such a way that they execute a slewing motion about swivel pins 20 thereof in the direction of brake drum 12 in order to produce the braking engagement between friction linings 12 and brake drum 12. As shown in FIG. 3, solenoid actuator 28 of locking device 26 is fixed-mounted to output shaft 16. Alternatively, magnet actuator 28 may also be attached to a fixed housing part (not shown) and act in a contactless manner on locking pins 24. Locking pins 24, which are movable back and forth in response to solenoid actuator 28, extend through through-holes 30 provided in brake-shoe holder 14 and, in the state illustrated in FIGS. 1, 3 and 5, in which the braking action was not yet initiated, engage in engagement openings 32, which are provided in each of brake shoes 18. In this manner, brake shoes 18 are locked in place on brake-shoe holder 14. In the case of triggering of the brake system, solenoid actuator 28 pulls a ring armature, to which locking pins 24 are fastened, by a defined release travel s out of brake-shoe holder 14 and thus releases brake shoes 18 (see FIG. 4). These brake shoes position themselves against fixed brake drum 12 in response to the centrifugal forces, respectively the centrifugal acceleration generated by rotating output shaft 16, whereby the friction pairing required to decelerate output shaft 16 is formed between friction linings 22 of brake shoes 18 and brake drum 12. Even when locking pins 24 are moved back and forth with the aid of solenoid actuator 28 in the present exemplary embodiment, it is pointed out that locking pins 24 may also be alternatively moved under the action of a spring force or the like in one of the two directions of motion. Thus, the forward motion of locking pins 24 may take place under the influence of solenoid actuator 28, while they are reset by one or more spring elements, or the reverse.

Boost factor C* is defined as a function of the geometric dimensions of the structural design, it being necessary for it to reside in the self-energization or self-locking range of the system. For this case, only a short pulse is needed to form the friction pairing since brake shoes 18 are pressed against brake drum 12 as a result of the occurring force equilibrium.

Figure 4:
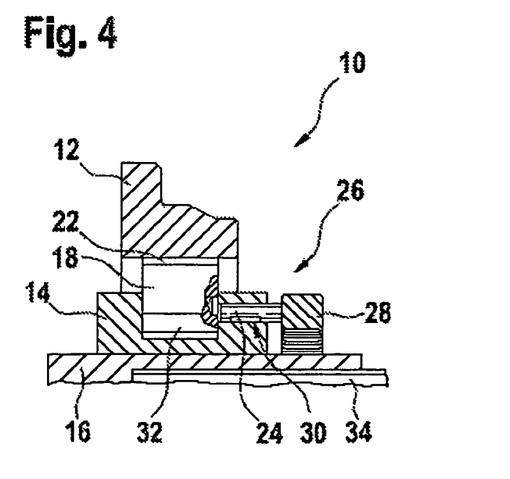
FIG. 4 shows a schematic longitudinal sectional view of the emergency braking system illustrated in FIG. 1 through 3 in a state in which the braking action was triggered.
Figure 5:
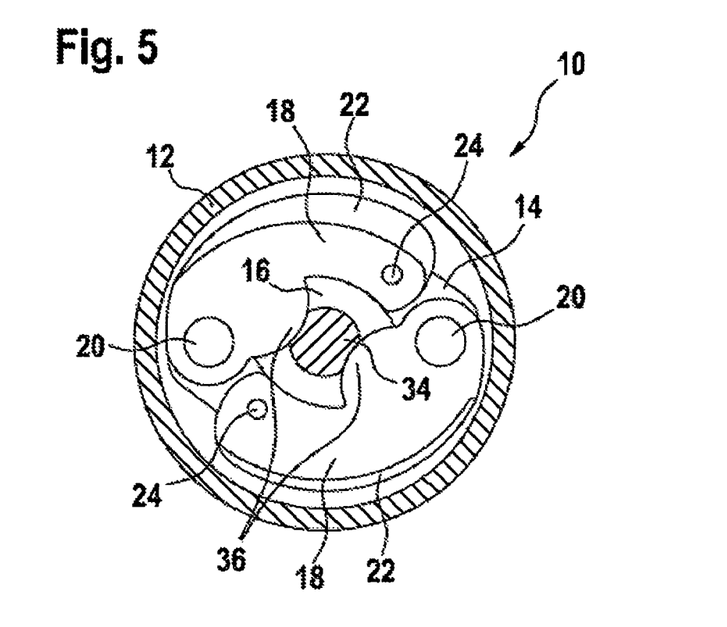
FIG. 5 shows a schematic cross-sectional view of the emergency braking system illustrated in FIG. 1 through 4 in a state in which the braking action was not triggered.
Figure 6:
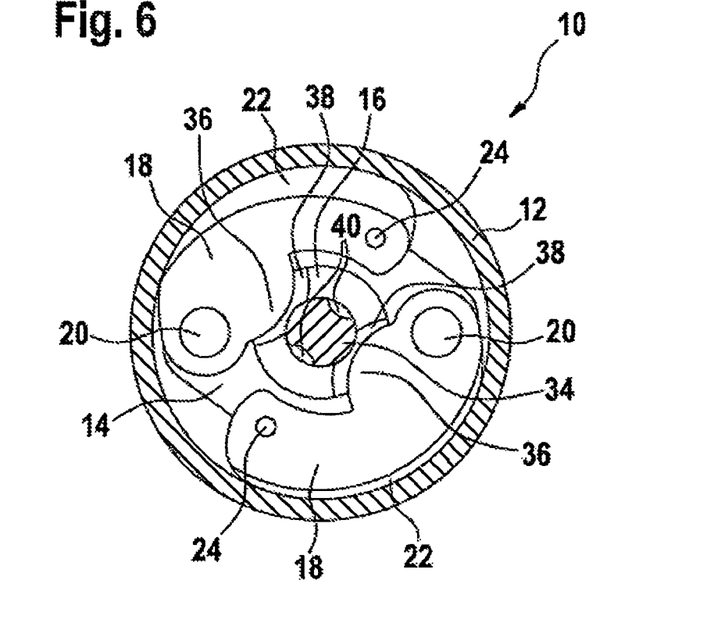
FIG. 6 shows a schematic cross-sectional view of the emergency braking system illustrated in FIG. 1 through 5 in a state in which the braking action was triggered.

As is readily discernible from FIGS. 3 and 4, in particular, output shaft 16 to be braked with the aid of emergency braking system 10 is designed as a hollow shaft, in whose hollow space a drive shaft 34 is accommodated that constitutes a part of a drive train (not shown in detail). To couple output shaft 16 and drive shaft 34 to one another in a torsionally fixed manner, protruding arcuate projections 36 are formed on brake shoes 18 in the direction of the midpoint of output shaft 16 and drive shaft 34, which each extend through through-holes 38 that are provided in output shaft 16 and engage in prism-shaped recesses 40 of drive shaft 34, as illustrated in FIG. 5. By the engagement of projections 36 provided on brake shoes 18 into corresponding recesses 40 of drive shaft 34, output shaft 16 and drive shaft 34 are coupled to one another in a torsionally fixed manner. If the braking action is initiated starting out from the state illustrated in FIG. 5, then, in response to locking pins 24 being pulled by release travel s out of brake shoes 18, brake shoes 18 rotate about respective swivel pins 20 thereof in the direction of brake drum 12, so that projections 36 configured on brake shoes 18 come out of engagement with associated recesses 40 of drive shaft 34, thereby decoupling drive shaft 34 from output shaft 16. As a result of this decoupling, the drive train is not subjected to the deceleration torques produced during the braking action, so that it cannot be damaged. In addition, it is possible to design the drive train components to be less rugged since they are not subjected to any substantial loads during the braking action. Thus, for example, the cross section of motor-side drive shaft 34 may be designed to be smaller than when no decoupling device is provided for decoupling the drive train. What is decisive, however, is the advantage derived herefrom that the number of components to be decelerated is reduced to a minimum. This has a positive effect on the system load during the deceleration phase, as already described previously.

The previously described design of emergency braking system 10 allows the time interval for triggering the braking action to be considerably shortened since the braking action is carried out between brake drum 12 and brake shoes 18 under the influence of the centrifugal force or centrifugal acceleration, which result from the rotation of output shaft 16. In principle, the requisite response times within the range of a few milliseconds are made possible on the basis of calculations.

In addition, an electromechanical system is realized by the design illustrated in FIG. 1 through 6 without the use of additional energy forms which, under certain circumstances, would compromise the full reversibility and signify a limitation of the same.

Through the use of a two-sided application of the peripheral frictional force of the friction pairing, the rolling bearings presently used are protected and do not need to be reengineered or even newly conceived due to concerns related to the durability of the entire system, whereby, in turn, an increased inertia of mass would be introduced into the system.

Employing the type of design described above also makes it possible to avoid peripherally extending outer geometries of the brake unit, so that an easily encapsulated, closed system having a compact design may be realized which, in addition, is positively integrated into the special concerns of industrial safety when working with machine tools.

It is understood that solenoid actuator 28 is actuated by output signals of corresponding sensors which detect a state in which an operator comes dangerously close to the tool of a machine tool, for example to the saw blade of the saw. Sensors of this kind are known in the related art, so they will not be discussed in greater detail here. Radar sensors, in particular UWB radar sensors (UWB=ultra wide band), as well as optical sensors, in particular NIR systems (NIR=near infra red) are mentioned here exemplarily, but not exclusively.

Figure 7:
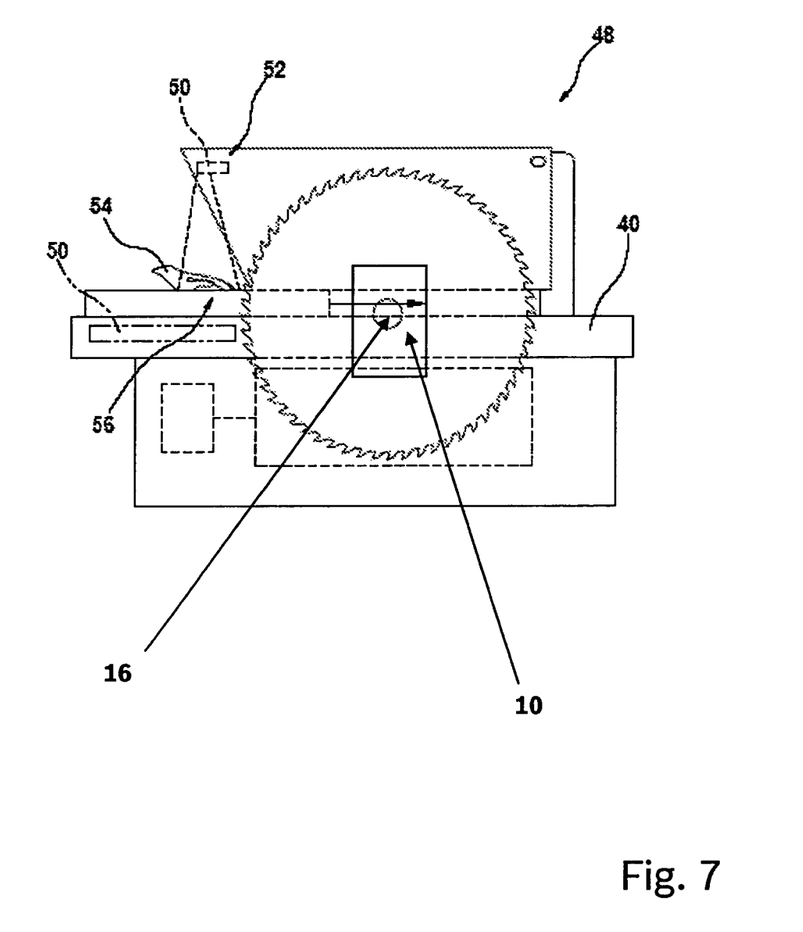
FIG. 7 shows a first exemplary embodiment of a machine tool according to the present invention in the form of a circular saw bench, including an emergency braking system.

FIG. 7 illustrates a first exemplary embodiment of a machine tool according to the present invention in the form of a circular saw, in particular a benchtop circular saw (benchtop system). Circular saw 48 of FIG. 7 has an emergency braking system 10 and a sensor system 52 for detecting the presence of a material type 54, in particular of tissue, such as human tissue of a hand, in a machine-tool machining range 56. For detection purposes, device 52 has at least one sensor 50 that may be installed in a plane above the machining range of the machine tool, as is indicated in FIG. 7. Alternatively, sensor 50 of device 52 may also be directly integrated in workbench 40. Both possibilities may be realized individually, as well as simultaneously, as is illustrated exemplarily in FIG. 7. Device 52 for detecting human tissue, in particular, but also other materials, may also encompass radar sensors, in particular UWB radar sensors (UWB=ultra wide band) and/or optical sensors as well, in particular NIR systems (NIR=near infra red) exemplarily and not exclusively.

When, for example, a hand 54 is detected in the danger zone directly in front of the saw blade of the machine tool, an activity signal is generated that triggers the safety pins of the brake shoes, so that they—as described in detail above—, driven by the centrifugal force, are driven against brake drum 12 and initiate the braking action.

If for purposes of the speed ratio, a gear stage is to be integrated, then the system is to be advantageously mounted on the tool shaft, in order to protect the gear stage from overload in the event of an emergency braking. The gear stage and the motor shaft are consequently decoupled, as described above.

Even when in the case of the previously described specific embodiment, a circular saw bench was selected as an example of a machine tool, it should be clear that the principle of the present invention is also applicable to other machine tools.

Therefore, a few possible other machine tools, as well as possible locations for integrating the particular emergency braking system 10 are briefly presented in the following, exemplarily and not exclusively. Braking system 10 is denoted by B in the particular machine tool representations and schematically combined into a black box, whose contents correspond to that described above.

Figure 8:
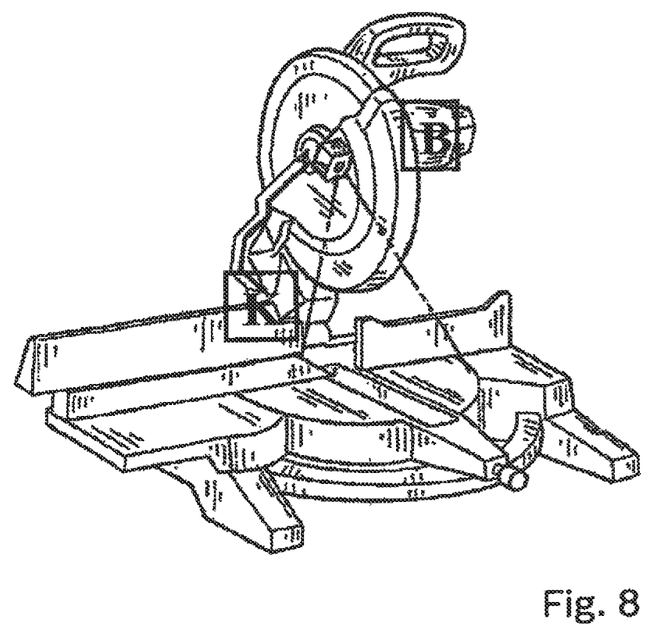
FIG. 8 shows another exemplary embodiment of the machine tool according to the present invention in the form of a cross-cut saw, including an emergency braking system.

FIG. 8 depicts a cross-cut saw as a possible machine tool in accordance with the present invention that may likewise be considered as representative for cross-cut and miter saws. In this case, preference may be given to integrating brake system 10 (represented symbolically in the following in the form of box B) in the closest possible proximity to the saw blade. If, for purposes of the speed ratio, a gear stage is to be integrated in the machine tool, then the system is to be advantageously mounted on the tool shaft, in order to protect the gear stage from overload in the event of an emergency braking. The gear stage and the motor shaft are then consequently decoupled.

Moreover, to prevent an unwanted, swift lopping-type movement of the saw head and thus of the saw blade from occurring in the event of an emergency braking, a suitable unit K is to be mounted at the lower end of the machine arm, i.e., at its pivot point, which constitutes an articulated connection to the saw bench of the machine tool. This would occur as a forced movement due to the braking torque to be applied, thereby endangering the user, which is unacceptable and should always be prevented.

The position of brake system 10 respectively B, described as preferable, also remains unchanged even when possibly a V-belt drive, flat-belt drive or toothed-belt drive is used between the motor and gear stage, as is customary for cross-cut and miter saws, such as the BOSCH GCM12SD, for example.

Figure 9:
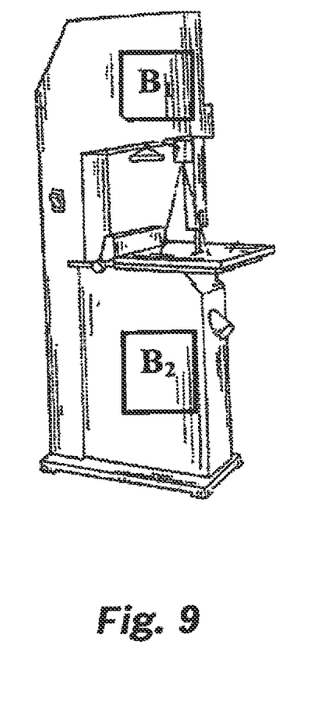
FIG. 9 shows another exemplary embodiment of the machine tool according to the present invention in the form of a band saw, including an emergency braking system.

A band saw having a schematically drawn brake system is discernible in Illustration 9. In this case, it is advantageous to provide the braking device at least one of the two conveyor wheels, which may be, however, at that wheel which has a connection to the drive unit. This may be important in case it is deemed appropriate, due to the time required for the braking action or to protect the drive, to decouple the mass moment of inertia of the driving components, since this constitutes a core function of the brake system.

Alternatively, two brake systems 10 (corresponding to $B_1$ and $B_2$) are integrated in this machine tool. If V-belt or flat-belt drives provide the linkage of the motor shaft or gear shaft to one of the conveyor wheels, it is then possible to prevent a decoupling of the drive components while taking a belt slip into account, given a simultaneous deactivation of the drive. The brake system would have to be adapted accordingly for this case.

Important in this connection is, however, that the braking of at least one of the conveyor rollers does not necessarily induce the immediate braking of the tool, i.e., of the rotating belt. In this case, the device is to be advantageously structurally modified in a way that makes it possible to selectively avoid a slip of the belt due to the inertia thereof.

Figure 10:
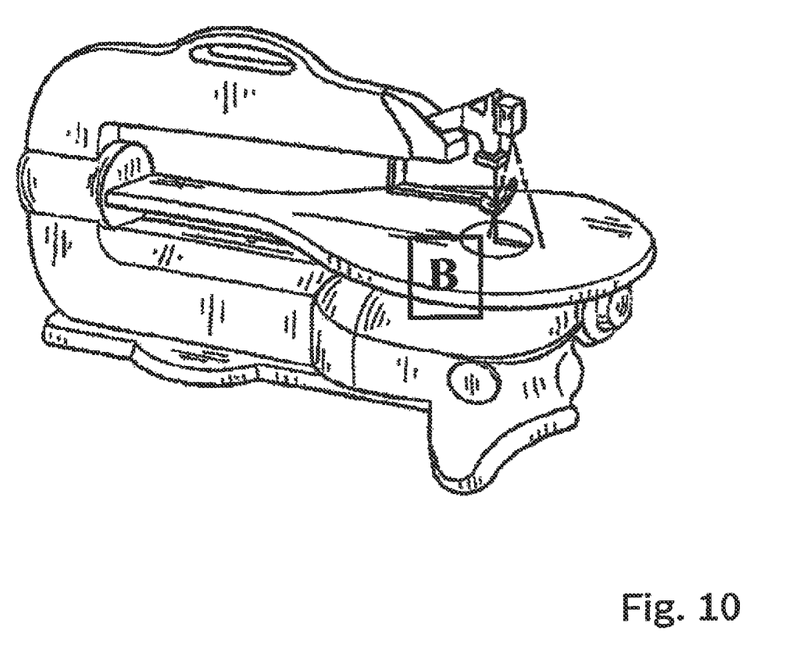
FIG. 10 shows another exemplary embodiment of the machine tool according to the present invention in the form of a scroll saw, including an emergency braking system.

One possible variant of an embodiment of a scroll saw is discernible in Illustration 10. In this case, brake system 10 is suited for integration in the bottom housing part, so that, in this case, the pendulum mechanism typically present here, an eccentric shaft or the like, may be braked and, if desired, the drive unit may be simultaneously decoupled.

However, with regard to the effect of such a braking action on the tool's sequence of movements, it is important that the braking of the uniformly rotating eccentric shaft have different braking scenarios as a consequence on the tool, depending on the particular eccentric position. This is explained by the use of a gear having a varying velocity ratio.

Figure 11:
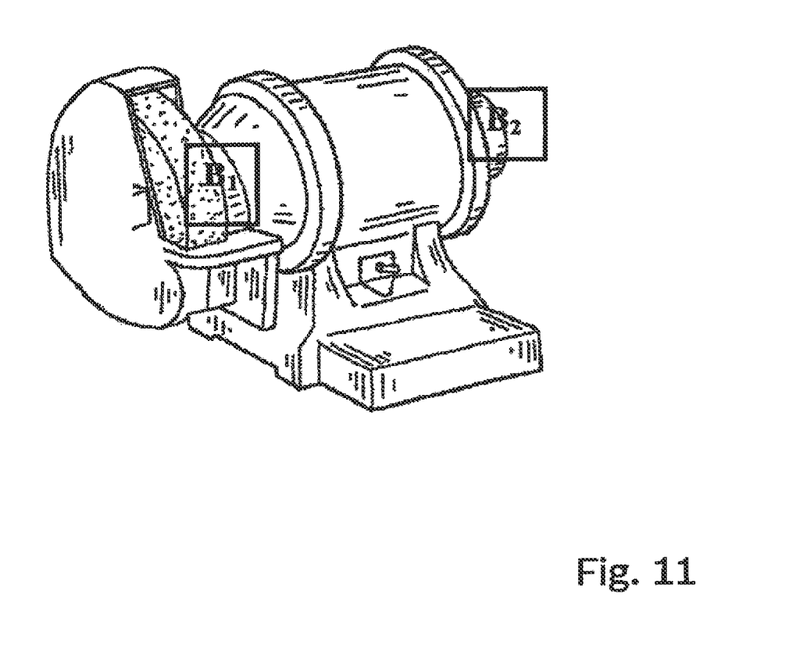
FIG. 11 shows another exemplary embodiment of the machine tool according to the present invention in the form of a sander, including an emergency braking system.

A sander is schematically shown in Illustration 11. In this case, position ($B_1$) may be used for brake system 10, in order to position the same between the drive and the tool. In this case, one derives the advantage of a possible and, in addition, simple to implement decoupling of the drive unit. However, in the case of the device shown here, a direct connection of the motor to the grinding disk is provided. Since no gear stage is hereby provided, this permits a safe braking of the entire machine together with the drive unit, in the case that braking the additional mass moment of inertia of the drive components is not deemed critical to the temporal extent of the braking action. For this, installation position ($B_2$) of the brake system would likewise be suited. In principle, however, both installation cases may be utilized for both types of braking, with and without decoupling of the drive.

Figure 12:
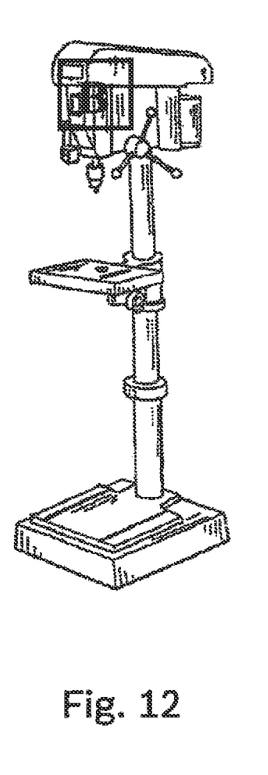
FIG. 12 shows another exemplary embodiment of the machine tool according to the present invention in the form of a power drill, including an emergency braking system.

An exemplarily illustrated vertical drilling machine is discernible in Illustration 12. It is practical in this instance that the brake system be provided near the working spindle to permit a targeted braking of the tool. Due to the belt drive that is usually integrated in these devices, it may be useful to dispense with a decoupling of the drive, whereby both the complexity of the braking device, as well as the work expended to restore it to the state of readiness are reduced.

Figure 13:
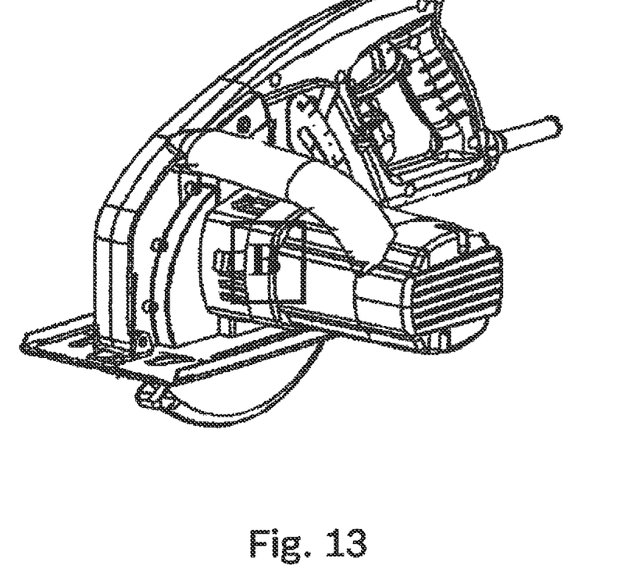
FIG. 13 shows another exemplary embodiment of the machine tool according to the present invention in the form of a handheld circular saw, including an emergency braking system.

In the case of the handheld circular saw illustrated in Illustration 13, the brake system may be configured between the drive and the tool. Here, however, without the use of a supplementary device, there are limits to the deceleration characteristic. In this case, a housing is not able to brace against the deceleration torque resulting from the required braking times or a corresponding countermass is not able to dynamically absorb the same. Thus, the mere triggering of an emergency braking in such a handheld device would result in a kickback effect in the rotational direction of the saw blade that the user may not be able to brace himself against. Therefore, such a handheld system advantageously has an anti-kickback device to compensate for the kickback effect.

The machine tool according to the present invention is not limited to the illustrated or discussed exemplary embodiments.

What is claimed is:

1. A machine tool, comprising:
    an emergency braking system for abruptly braking a rotating shaft of the machine tool, the emergency braking system having at least one brake drum and at least one brake shoe which are forced into mutual engagement to brake the shaft;
    a locking device that is adjustable between a locked position, in which the brake shoe is held in position on the brake-shoe holder, and a release position in which the at least one brake shoe is released so that it executes a slewing motion in the direction of the brake drum to produce the braking engagement;
    wherein the brake drum and the at least one brake shoe are configured so as to allow the braking engagement therebetween to take place under the influence of the centrifugal force resulting from the rotation of a shaft of the machine tool; and
    wherein the emergency braking system brakes within 50 ms.

2. The machine tool of claim 1, further comprising:
    a coupling device, which is configured so that in a coupled position, the coupling device connects the shaft to be braked to a drive shaft of a drive train, and so that, during an emergency braking, the coupling device is automatically moved to a decoupled position in which the shaft to be braked is decoupled from the drive shaft of the drive train.

3. The machine tool of claim 2, wherein the coupling device includes:
    projections configured on the at least one brake shoe;
    through-holes configured on the shaft to be braked; and
    recesses configured on the drive shaft of the drive train;
    wherein in the coupled position the projections are engaged with the through-holes and engaged with the recesses; and
    wherein in the decoupled position the projections are engaged with the through-holes and disengaged from the recesses.

4. The machine tool of claim 3, wherein the locking device includes at least one locking element that is movable between a locked position, in which the locking element engages with the at least one brake shoe, and a release position, in which the locking element is decoupled from the brake shoe,
    wherein in the locked position, the projections and the recesses are in the coupled position; and
    wherein in the release position, the projections and the recesses are in the decoupled position.

5. The machine tool of claim 1, wherein the at least one brake shoe of the emergency braking system is pivotably attached to a brake-shoe holder that is mounted on the shaft and co-rotates therewith.

6. The machine tool of claim 1, wherein the locking device includes at least one locking element that is movable between a locked position, in which it engages with the at least one brake shoe, and a release position, in which it is decoupled from the brake shoe.

7. The machine tool of claim 1, wherein the locking device includes an actuator which moves the locking device from the locked position to the release position.

8. The machine tool of claim 1, wherein the emergency braking system has a reset device for moving the at least one brake shoe back to the locked position.

9. The machine tool of claim 1, wherein the machine tool is a circular saw bench.

* * * * *

UNITED STATES PATENT AND TRADEMARK OFFICE
CERTIFICATE OF CORRECTION

PATENT NO. : 8,689,948 B2 Page 1 of 1
APPLICATION NO. : 12/736315
DATED : April 8, 2014
INVENTOR(S) : Thomas Winkler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Twenty-ninth Day of September, 2015

Michelle K. Lee
*Director of the United States Patent and Trademark Office*